(12) United States Patent
Johnston et al.

(10) Patent No.: US 11,115,276 B2
(45) Date of Patent: Sep. 7, 2021

(54) SERVICE FUNCTION CHAIN OPTIMIZATION USING LIVE TESTING

(71) Applicant: Cisco Technology, Inc., San Jose, CA (US)

(72) Inventors: Jay Kemper Johnston, Raleigh, NC (US); Michael Robertson, Apex, NC (US); Magnus Mortensen, Cary, NC (US); David C. White, Jr., St. Petersburg, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/883,170

(22) Filed: May 26, 2020

(65) Prior Publication Data

US 2020/0287792 A1   Sep. 10, 2020

Related U.S. Application Data

(63) Continuation of application No. 15/656,607, filed on Jul. 21, 2017, now Pat. No. 10,673,698.

(51) Int. Cl.
  *G06F 15/177*   (2006.01)
  *H04L 12/24*    (2006.01)
  *H04L 12/26*    (2006.01)

(52) U.S. Cl.
  CPC ...... *H04L 41/0823* (2013.01); *H04L 41/0846* (2013.01); *H04L 41/5041* (2013.01);
  (Continued)

(58) Field of Classification Search
  CPC ............ H04L 41/0823; H04L 41/0846; H04L 41/5041; H04L 43/026; H04L 43/08; H04L 43/0894
  (Continued)

(56) References Cited

U.S. PATENT DOCUMENTS 3,629,512 A   12/1971   Yuan
4,769,811 A    9/1988   Eckberg, Jr. et al.
(Continued)

FOREIGN PATENT DOCUMENTS

CN   103716123   4/2014
CN   103716137   4/2014
(Continued)

OTHER PUBLICATIONS

International Search Report and Written Opinion from the International Searching Authority, dated Oct. 9, 2018, 15 pages, for the corresponding International Application PCT/US2018/043010.
(Continued)

*Primary Examiner* — Atta Khan
(74) *Attorney, Agent, or Firm* — Polsinelli

(57) ABSTRACT

Aspects of the disclosed technology address the problems of manually identifying and optimizing service chain (SC) performance bottlenecks by providing solutions for automatically identifying and tuning various SC parameters. In some aspects, a SC optimization process of the disclosed technology includes the replication or cloning of a SC for which traffic flow is to be optimized. Traffic flows for the production chain can then be simulated over one or more SC clones to identify and tune individual system parameters, for example, to determine if the simulated changes produce a positive, negative, or neutral change in flow performance. Systems and machine-readable media are also provided.

20 Claims, 5 Drawing Sheets

(52) U.S. Cl.
CPC ............ *H04L 43/026* (2013.01); *H04L 43/08* (2013.01); *H04L 43/0894* (2013.01)

(58) Field of Classification Search
USPC ........................................................ 709/221
See application file for complete search history.

(56) References Cited

U.S. PATENT DOCUMENTS

| | | | |
|---|---|---|---|
| 5,408,231 A | 4/1995 | Bowdon | |
| 5,491,690 A | 2/1996 | Alfonsi et al. | |
| 5,557,609 A | 9/1996 | Shobatake et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |
| 6,400,681 B1 | 6/2002 | Bertin et al. | |
| 6,661,797 B1 | 12/2003 | Goel et al. | |
| 6,687,229 B1 | 2/2004 | Kataria et al. | |
| 6,799,270 B1 | 9/2004 | Bull et al. | |
| 6,888,828 B1 | 5/2005 | Partanen et al. | |
| 6,993,593 B2 | 1/2006 | Iwata | |
| 7,027,408 B2 | 4/2006 | Nabkel et al. | |
| 7,062,567 B2 | 6/2006 | Benitez et al. | |
| 7,095,715 B2 | 8/2006 | Buckman et al. | |
| 7,096,212 B2 | 8/2006 | Tribble et al. | |
| 7,139,239 B2 | 11/2006 | Mcfarland et al. | |
| 7,165,107 B2 | 1/2007 | Pouyoul et al. | |
| 7,197,008 B1 | 3/2007 | Shabtay et al. | |
| 7,197,660 B1 | 3/2007 | Liu et al. | |
| 7,209,435 B1 | 4/2007 | Kuo et al. | |
| 7,227,872 B1 | 6/2007 | Biswas et al. | |
| 7,231,462 B2 | 6/2007 | Berthaud et al. | |
| 7,333,990 B1 | 2/2008 | Thiagarajan et al. | |
| 7,443,796 B1 | 10/2008 | Albert et al. | |
| 7,458,084 B2 | 11/2008 | Zhang et al. | |
| 7,472,411 B2 | 12/2008 | Wing et al. | |
| 7,486,622 B2 | 2/2009 | Regan et al. | |
| 7,536,396 B2 | 5/2009 | Johnson et al. | |
| 7,552,201 B2 | 6/2009 | Areddu et al. | |
| 7,558,261 B2 | 7/2009 | Arregoces et al. | |
| 7,567,504 B2 | 7/2009 | Darling et al. | |
| 7,571,470 B2 | 8/2009 | Arregoces et al. | |
| 7,573,879 B2 | 8/2009 | Narad et al. | |
| 7,610,375 B2 | 10/2009 | Portolani et al. | |
| 7,643,468 B1 | 1/2010 | Arregoces et al. | |
| 7,644,182 B2 | 1/2010 | Banerjee et al. | |
| 7,647,422 B2 | 1/2010 | Singh et al. | |
| 7,657,898 B2 | 2/2010 | Sadiq | |
| 7,657,940 B2 | 2/2010 | Portolani et al. | |
| 7,668,116 B2 | 2/2010 | Wijnands et al. | |
| 7,684,321 B2 | 3/2010 | Muirhead et al. | |
| 7,738,469 B1 | 6/2010 | Shekokar et al. | |
| 7,751,409 B1 | 7/2010 | Carolan | |
| 7,774,440 B1* | 8/2010 | Bagrodia | H04L 41/0823 709/221 |
| 7,793,157 B2 | 9/2010 | Bailey et al. | |
| 7,814,284 B1 | 10/2010 | Glass et al. | |
| 7,831,693 B2 | 11/2010 | Lai | |
| 7,852,785 B2 | 12/2010 | Lund et al. | |
| 7,860,095 B2 | 12/2010 | Forissier et al. | |
| 7,860,100 B2 | 12/2010 | Khalid et al. | |
| 7,895,425 B2 | 2/2011 | Khalid et al. | |
| 7,899,012 B2 | 3/2011 | Ho et al. | |
| 7,899,861 B2 | 3/2011 | Feblowitz et al. | |
| 7,907,595 B2 | 3/2011 | Khanna et al. | |
| 7,908,480 B2 | 3/2011 | Firestone et al. | |
| 7,925,729 B2* | 4/2011 | Bush | H04L 41/0233 709/223 |
| 7,983,174 B1 | 7/2011 | Monaghan et al. | |
| 7,990,847 B1 | 8/2011 | Leroy et al. | |
| 8,000,329 B2 | 8/2011 | Fendick et al. | |
| 8,018,938 B1 | 9/2011 | Fromm et al. | |
| 8,094,575 B1 | 1/2012 | Vadlakonda et al. | |
| 8,095,683 B2 | 1/2012 | Balasubramaniam Chandra | |
| 8,116,307 B1 | 2/2012 | Thesayi et al. | |
| 8,166,465 B2 | 4/2012 | Feblowitz et al. | |
| 8,180,909 B2 | 5/2012 | Hartman et al. | |
| 8,191,119 B2 | 5/2012 | Wing et al. | |
| 8,195,774 B2 | 6/2012 | Lambeth et al. | |
| 8,280,354 B2 | 10/2012 | Smith et al. | |
| 8,281,302 B2 | 10/2012 | Durazzo et al. | |
| 8,291,108 B2 | 10/2012 | Raja et al. | |
| 8,305,900 B2 | 11/2012 | Bianconi | |
| 8,311,045 B2 | 11/2012 | Quinn et al. | |
| 8,316,457 B1 | 11/2012 | Paczkowski et al. | |
| 8,355,332 B2 | 1/2013 | Beaudette et al. | |
| 8,442,043 B2 | 5/2013 | Sharma et al. | |
| 8,451,817 B2 | 5/2013 | Cheriton | |
| 8,464,336 B2 | 6/2013 | Wei et al. | |
| 8,473,981 B1 | 6/2013 | Gargi | |
| 8,479,298 B2 | 7/2013 | Keith et al. | |
| 8,498,414 B2 | 7/2013 | Rossi | |
| 8,520,672 B2 | 8/2013 | Guichard et al. | |
| 8,601,152 B1 | 12/2013 | Chou | |
| 8,605,588 B2 | 12/2013 | Sankaran et al. | |
| 8,612,612 B1 | 12/2013 | Dukes et al. | |
| 8,627,328 B2 | 1/2014 | Mousseau et al. | |
| 8,645,952 B2 | 2/2014 | Biswas et al. | |
| 8,676,965 B2 | 3/2014 | Gueta | |
| 8,676,980 B2 | 3/2014 | Kreeger et al. | |
| 8,700,892 B2 | 4/2014 | Bollay et al. | |
| 8,724,466 B2 | 5/2014 | Kenigsberg et al. | |
| 8,730,980 B2 | 5/2014 | Bagepalli et al. | |
| 8,743,885 B2 | 6/2014 | Khan et al. | |
| 8,751,420 B2 | 6/2014 | Hjelm et al. | |
| 8,762,534 B1 | 6/2014 | Hong et al. | |
| 8,762,707 B2 | 6/2014 | Killian et al. | |
| 8,792,490 B2 | 7/2014 | Jabr et al. | |
| 8,793,400 B2 | 7/2014 | Mcdysan et al. | |
| 8,812,730 B2 | 8/2014 | Vos et al. | |
| 8,819,419 B2 | 8/2014 | Carlson et al. | |
| 8,825,070 B2 | 9/2014 | Akhtar et al. | |
| 8,830,834 B2 | 9/2014 | Sharma et al. | |
| 8,904,037 B2 | 12/2014 | Haggar et al. | |
| 8,984,284 B2 | 3/2015 | Purdy, Sr. et al. | |
| 9,001,827 B2 | 4/2015 | Appenzeller | |
| 9,071,533 B2 | 6/2015 | Hui et al. | |
| 9,077,661 B2 | 7/2015 | Andreasen et al. | |
| 9,088,584 B2 | 7/2015 | Feng et al. | |
| 9,130,872 B2 | 9/2015 | Kumar et al. | |
| 9,143,438 B2 | 9/2015 | Khan et al. | |
| 9,160,797 B2 | 10/2015 | Mcdysan | |
| 9,178,812 B2 | 11/2015 | Guichard et al. | |
| 9,189,285 B2 | 11/2015 | Ng et al. | |
| 9,203,711 B2 | 12/2015 | Agarwal et al. | |
| 9,253,274 B2 | 2/2016 | Quinn et al. | |
| 9,300,579 B2 | 3/2016 | Frost et al. | |
| 9,300,585 B2 | 3/2016 | Kumar et al. | |
| 9,311,130 B2 | 4/2016 | Christenson et al. | |
| 9,319,324 B2 | 4/2016 | Beheshti-Zavareh et al. | |
| 9,325,565 B2 | 4/2016 | Yao et al. | |
| 9,338,097 B2 | 5/2016 | Anand et al. | |
| 9,344,337 B2 | 5/2016 | Kumar et al. | |
| 9,374,297 B2 | 6/2016 | Bosch et al. | |
| 9,379,931 B2 | 6/2016 | Bosch et al. | |
| 9,385,950 B2 | 7/2016 | Quinn et al. | |
| 9,398,486 B2 | 7/2016 | La Roche, Jr. et al. | |
| 9,407,540 B2 | 8/2016 | Kumar et al. | |
| 9,413,655 B2 | 8/2016 | Shatzkamer et al. | |
| 9,424,065 B2 | 8/2016 | Singh et al. | |
| 9,436,443 B2 | 9/2016 | Chiosi et al. | |
| 9,444,675 B2 | 9/2016 | Guichard et al. | |
| 9,473,570 B2 | 10/2016 | Bhanujan et al. | |
| 9,479,443 B2 | 10/2016 | Bosch et al. | |
| 9,491,094 B2 | 11/2016 | Patwardhan et al. | |
| 9,537,836 B2 | 1/2017 | Maller et al. | |
| 9,558,029 B2 | 1/2017 | Behera et al. | |
| 9,559,970 B2 | 1/2017 | Kumar et al. | |
| 9,571,405 B2 | 2/2017 | Pignataro et al. | |
| 9,608,896 B2 | 3/2017 | Kumar et al. | |
| 9,614,739 B2 | 4/2017 | Kumar et al. | |
| 9,660,909 B2 | 5/2017 | Guichard et al. | |
| 9,723,106 B2 | 8/2017 | Shen et al. | |
| 9,774,533 B2 | 9/2017 | Zhang et al. | |

(56) References Cited

U.S. PATENT DOCUMENTS

| | | |
|---|---|---|
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2006/0271673 A1* | 11/2006 | Christodoulou .... H04L 43/0817 709/224 |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti, Sr. et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2011/0282642 A1* | 11/2011 | Kruger ............... G06F 11/3668 703/27 |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0051893 A1* | 2/2015 | Ratcliffe, III ......... H04L 41/145 703/13 |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |

(56) References Cited

U.S. PATENT DOCUMENTS

| | | |
|---|---|---|
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043944 A1* | 2/2016 | Felstaine .......... H04L 47/12 370/389 |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0080496 A1 | 3/2016 | Falanga et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0308503 A1* | 10/2017 | Somohano .......... H04L 45/02 |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |
| 2019/0028347 A1* | 1/2019 | Johnston .......... H04L 43/08 |

FOREIGN PATENT DOCUMENTS

| | | |
|---|---|---|
| EP | 2750331 | 7/2014 |
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Katsikas et al., "Profiling and accelerating commodity NFV service chains with SCC," The Journal of Systems and Software, vol. 127, Jan. 2017, pp. 12-27.

Aldrin, S., et al. "Service Function Chaining Operation, Administration and Maintenance Framework," Internet Engineering Task Force, Oct. 26, 2014, 13 pages.

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, ©Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, ©ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749169.

Author Unknown, "GStreamer and in-band metadata," from RidgeRun Developer Connection, Jun. 19, 2012, 5 pages http://developersidgerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard ©ISO/IEC 2012—All Rights Reserved; Jan. 5, 2012; 131 pages.

Author Unknown, "M-PEG 2 Transmission," ©Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.

(56) References Cited

OTHER PUBLICATIONS

Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.

Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.

Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.

Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.

Author Unknown, "Service-Aware Network Architecture Based on SDN, NFV, and Network Intelligence," 2014, 8 pages.

Baird, Andrew, et al. "AWS Serverless Multi-Tier Architectures; Using Amazon API Gateway and AWS Lambda," Amazon Web Services Inc., Nov. 2015, 20 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Boucadair, Mohamed, et al., "Differentiated Service Function Chaining Framework," Network Working Group Internet Draft draft-boucadair-network-function-chaining-03, Aug. 21, 2013, 21 pages.

Bremler-Barr, Anat, et al., "Deep Packet Inspection as a Service," CoNEXT '14, Dec. 2-5, 2014, pp. 271-282.

Cisco Systems, Inc. "Cisco NSH Service Chaining Configuration Guide," Jul. 28, 2017, 11 pages.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Ersue, Mehmet, "ETSI NFV Management and Orchestration—An Overview," Presentation at the IETF# 88 Meeting, Nov. 3, 2013, 14 pages.

Farrel, A., et al., "A Path Computation Element (PCE)—Based Architecture," RFC 4655, Network Working Group, Aug. 2006, 40 pages.

Fayaz, Seyed K., et al., "Efficient Network Reachability Analysis using a Succinct Control Plane Representation," 2016, ratul.org, pp. 1-16

Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.

Jiang, Y., et al., "An Architecture of Service Function Chaining," IETF Network Working Group Internet Draft, draft-jiang-sfc-arch-01.txt, Feb. 14, 2014; 12 pages.

Jiang, Yuanlong, et al., "Fault Management in Service Function Chaining," Network Working Group, China Telecom, Oct. 16, 2015, 13 pages.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02122/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, P., et al., "Network Service Header," Network Working Group, Mar. 24, 2015, 42 pages; https://tools.ietf.org/pdf/draft-ietf-sfc-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Network Service Header," Network Working Group, draft-quinn-sfc-nsh-02.txt, Feb. 14, 2014, 21 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Quinn, Paul, et al., "Service Function Chaining (SFC) Architecture," Network Working Group Internet Draft draft-quinn-sfc-arch-05.txt, May 5, 2014, 31 pages.

Quinn, Paul, et al., "Service Function Chaining: Creating a Service Plane via Network Service Headers," IEEE Computer Society, 2014, pp. 38-44.

Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl.draft-snnpte-ide-http-live-streaming-00.

Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

Zhang, Ying, et al. "StEERING: A Software-Defined Networking for Inline Service Chaining," IEEE, 2013, IEEE, p. 10 pages.

* cited by examiner

SERVICE FUNCTION CHAIN OPTIMIZATION USING LIVE TESTING

CROSS-REFERENCE TO RELATED APPLICATION

This application is a Continuation of, and claims priority to, U.S. Non-Provisional patent application Ser. No. 15/656,607, filed Jul. 21, 2017, the content of which is incorporated herein by reference in its entirety.

BACKGROUND

1. Technical Field

The subject technology relates to the optimization of flows over service chains in a virtual network environment and in particular, to methods for cloning service chains and modifying various service chain parameters to determine optimal service chain configuration settings.

2. Introduction

Network Function Virtualization (NFV) technology, in combination with Software Defined Networking (SDN), promises to help transform today's carrier networks. It will transform how they are deployed and managed, and the way services are delivered. Some ultimate goals are to enable service providers to reduce costs, increase business agility, and accelerate the time to market of new services.

The utilization of NFV and SDN technologies allows the decoupling of network functions from underlying hardware so they run as software images or logical modules on commercial off-the-shelf and purpose-built hardware. NFV does so by using virtualization technologies (computers, networks, and storage media) to virtualize network functions. The objective is to reduce the dependence on physical devices by allocating and using physical and virtual resources only when and where needed. With such approaches, service providers can reduce overall costs by shifting components to a common physical infrastructure while optimizing its use, allowing them to respond more dynamically to changing market demands by deploying new applications and services as needed. The virtualization of network functions accelerates the time to market for new services by allowing for more automated and streamlined approaches to service delivery.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Figure 1:
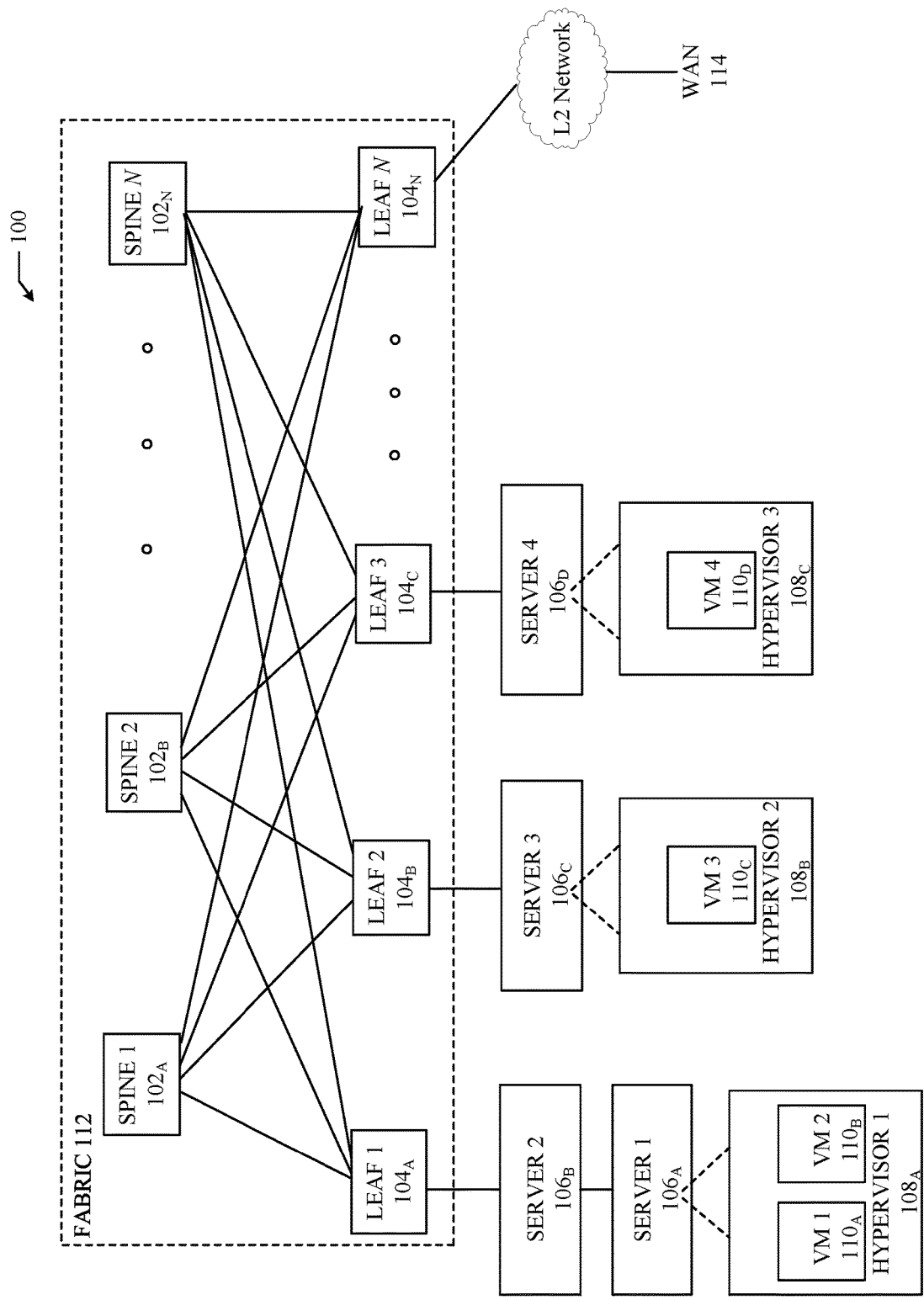
FIG. 1 illustrates an example network environment in which some aspects of the technology can be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

With the proliferation of network function virtualization (NFV) technologies, many network functionalities that were previously performed by hardware devices are now routinely implemented by virtual components. Some networks implement ordered chains of virtual components in what is known as network service chaining (SC) or service function chaining (SFC) to create ordered sequences of connected network services, e.g., firewalls, network address translation [NAT], intrusion protection, etc. This capability can be used by network operators to set up suites or catalogs of connected services that enable the use of a single network connection for many services with different characteristics.

One advantage of service chaining is to automate the way virtual network connections can be set up to handle traffic flows for connected services. For example, an SDN controller could take a chain of services and apply them to different traffic flows depending on the source, destination or type of traffic. The SFC capability automates what conventional network administrators do when they connect up a series of physical devices to process incoming and out coming network traffic, which may require a number of manual steps.

Due to trends in increasing network virtualization and abstraction, for example, with virtual machines and container networking, it has become increasingly difficult to diagnose and optimize traffic flow problems. Conventionally, traffic flow optimization in SFC environments is an arduous process that involves a time consuming manual trial-and-error style effort to tune individual system parameters, and requires cross-domain knowledge to predict how changes may impact flow performance.

Description

Aspects of the disclosed technology address the problems of manually identifying and optimizing SFC performance bottlenecks by providing solutions for automatically identifying and tuning SFC component parameters. In some aspects, an SFC optimization solution of the disclosed technology includes the replication or cloning of a selected SFC (i.e., a "production SFC" or "production chain") for which traffic flow is to be optimized. Traffic flows for the production chain can then be simulated over one or more SFC clones to identify and tune individual system parameters, for example, to determine if the simulated changes produce a positive, negative, or neutral change in flow performance. Simulated SFC configurations that are determined to positively impact traffic flows can be automatically pushed to the various production chain devices, for example, by automatically updating data-path parameters of the chain's containers, virtual machines, and/or virtual switches or other routing devices (e.g., "vswitches"), etc. Alternatively, in some aspects, traffic flows for the production chain may be redirected over the simulated SFC, effectively making it the new production chain.

As used herein, a service chain "device" can include physical and/or virtual devices. For example, the data-path of a service chain can include a mix of physical and virtual devices that are associated with a particular network operation or service function. Additionally, service chain or service function path "parameters" can include any configurable aspect of service chain and/or device operation. For example, a service chain parameter can relate to a particular function type, software version, protocol, or any other aspect of device operation.

As discussed in further detail below, a method of the disclosed technology can include steps for measuring a first set of performance metrics for a traffic flow directed over a production service chain (SC), where the production SC includes one or more physical and/or virtual devices, cloning the production SC to produce a cloned SC, where the cloned SC includes at least one configurable parameter or device that is different from the production SC, and measuring a second set of performance metrics for a second traffic flow directed over the cloned SC. In some aspects, the method can further include steps for identifying at least one configuration change for the production SC that is likely to improve flow performance for the traffic flow directed over the production SC, e.g., based on the first set of performance metrics and the second set of performance metrics, and automatically tuning the production SC to implement the configuration change.

FIG. 1 illustrates a diagram of an example network environment 100 in which various network function virtualization (NFV) devices can be implemented to form a service chain (SC). Fabric 112 can represent the underlay (i.e., the physical network) of environment 100. Fabric 112 includes spine switches 1-N ($102_{A-N}$) (collectively "102") and leaf switches 1-N ($104_{A-N}$) (collectively "104"). Leaf switches 104 can reside at the edge of fabric 112, and can represent the physical network edges. Leaf switches 104 can be, for example, top-of-rack ("ToR") switches, aggregation switches, gateways, ingress and/or egress switches, provider edge devices, and/or any other type of routing or switching device.

Leaf switches 104 can be responsible for routing and/or bridging tenant or endpoint packets and applying network policies. Spine 102 can perform switching and routing within fabric 112. Thus, network connectivity in fabric 112 can flow from spine switches 102 to leaf switches 104, and vice versa.

Leaf switches 104 can include servers 1-4 ($106_{A-D}$) (collectively "106"), hypervisors 1-3 ($108_A$-$108_C$) (collectively "108"), virtual machines (VMs) 1-4 ($110_A$-$110_D$) (collectively "110"). For example, leaf switches 104 can encapsulate and decapsulate packets to and from servers 106 in order to enable communications throughout environment 100. Leaf switches 104 can also connect other network-capable device(s) or network(s), such as a firewall, a database, a server, etc., to the fabric 112. Leaf switches 104 can also provide any other servers, resources, endpoints, external networks, VMs, services, tenants, or workloads with access to fabric 112.

Servers 106 can include hardware and software necessary to implement a network function virtualization (NFV) platform of the subject technology. An NFV platform may be implemented using hypervisors 108 to support various virtual network devices, for example, that are instantiated as one or more of VMs 110, and/or one or more network containers (not illustrated).

As discussed in further detail below with respect to FIGS. 2A and 2B, service chains that include various virtual network device types (and configurations) may be formed through, connection to a virtual switch, e.g., a 'vswitch.'

Figure 2A:
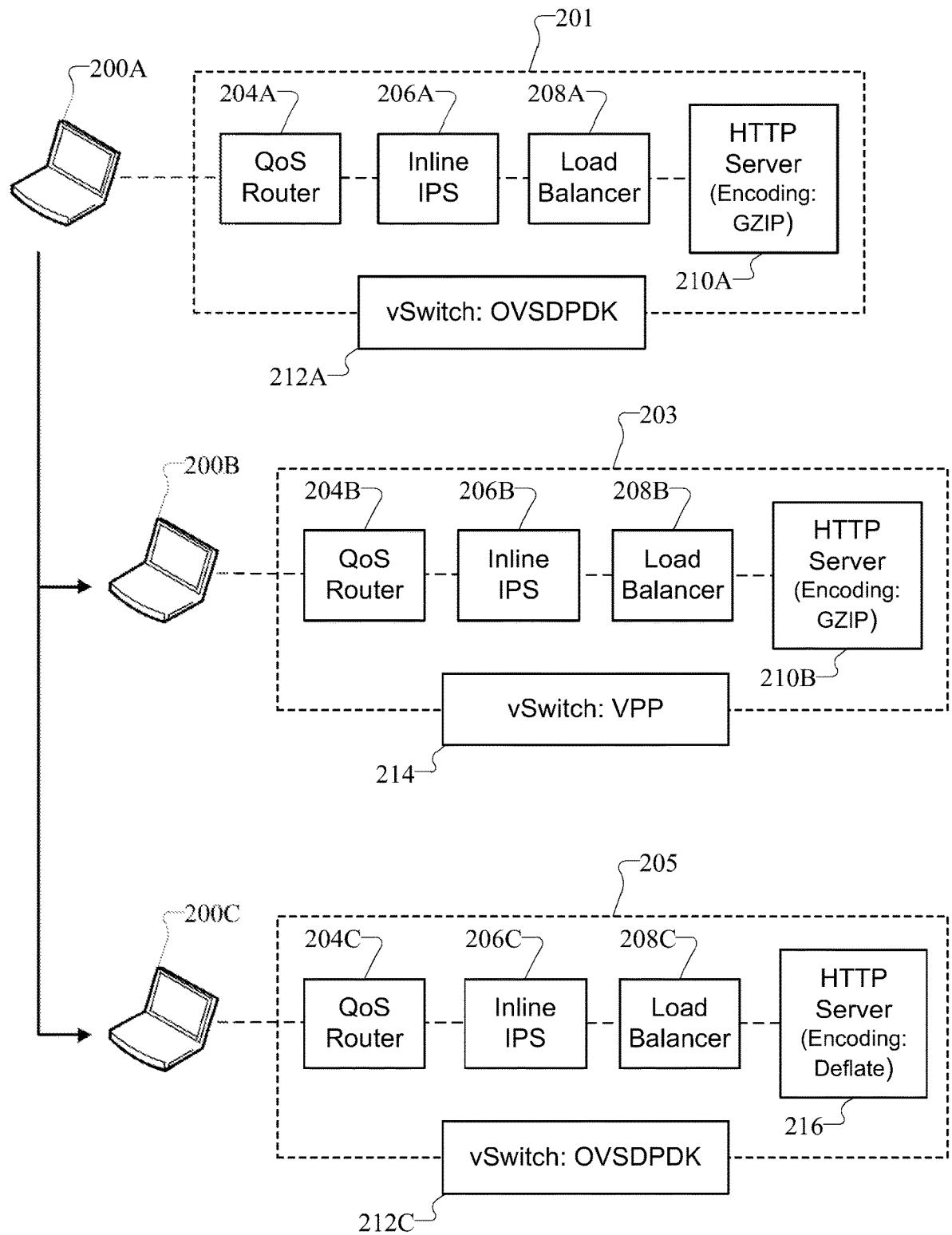
FIGS. 2A and 2B conceptually illustrate examples of service chain cloning and tuning, according to some aspects of the technology.

FIG. 2A conceptually illustrates an example of service chain cloning, according to some aspects of the technology. In particular, FIG. 2A depicts a production service chain (or "production SC") 201, and two clones of the production SC, i.e., a first cloned service chain (or "first cloned SC") 203, and a second cloned service chain (or "second cloned SC") 205.

Production SC 201 is configured to provide and/or receive traffic from a connected host 200A. Flows traversing production SC 201 are provided sequentially to each device or service in the chain. As illustrated in the example, traffic flows traversing production SC 201 must flow through a router (e.g., QoS Router 204A), an inline intrusion protection system (IPS) 206A, load balancer 208A, and a server (e.g., HTTP Server 210A). Each of the devices (204A, 206A, 208A, and 210A) is communicatively coupled via virtual switch 212A, for example, that is implemented using an Open vSwitch with the Data Plane Development Kit (OVS-DPDK).

Production SC 201 can include a greater (or fewer) number of devices, and/or devices of a different function/type, without departing from the technology. Additionally, as discussed in further detail below, various settings for each device, as well as any data-path parameters for the service chain, can vary depending on the desired implementation.

In operation, production SC 201 represents a functional service chain, for example, that is implemented in a virtual network environment, such as a network data center (DC). In some implementations, the production SC is cloned (duplicated), for example, in by instantiating similar (or identical) devices that are organized and configured in substantially the same way. By duplicating the production SC, changes can be made to certain device and/or data-path parameters in order to measure the overall effect on traffic flow performance for the cloned chain that is due to the parameter changes. As such, multiple different SC configurations can be used to test optimal data-path parameters, without the need to interfere with flows being processed by the production SC. Configuration changes determined to increase flow performance in a cloned SC can either be implemented in the original production service chain, or traffic flows may be redirected over a newly instantiated (cloned) SC, effectively designating it as the new "production SC."

Further to the example illustrated in FIG. 2A, production SC 201 is cloned to produce first cloned SC 203, and second cloned SC 205, which are coupled to host devices 200B and 200C, respectively. First cloned SC 203, and second cloned SC 205 represent service chains that are substantially similar to production chain 201, but with specific configuration changes. For example, first cloned SC 203 contains devices with associated device configurations that are similar to production SC 201. That is, first cloned SC 203 contains a QoS Router 204B, Inline IPS 206B, load balancer 208B, and server 210B. However, first cloned SC 203 is implemented using a different virtual switch, i.e., using vector packet processing (VPP), rather than OVS-DPDK.

Similarly, second cloned SC 205 contains a series of similar devices (e.g., 204C, 206C, and 208C), and a virtual switch 212C that is similar to production SC 201 (OVS-DPDK). However, second cloned SC 205 includes a HTTP Server 216 that uses a different compression protocol (i.e., "deflate"), than that of production SC 201.

With first cloned SC 203, and second cloned SC 205 each representing configuration changes with respect to production SC 201, traffic flows over the cloned SCs (203, 205) can be measured to determine if the configuration changes provide any performance benefits. To measure the performance of the cloned SCs, traffic flows for production SC 201 can be duplicated and routed over each of the cloned SCs (203, 205). Various metrics for the traffic flows are collected to determine what impact the changes had on flow performance. By way of example, end-to-end times for each packet to traverse its respective SC can be measured, and/or processing durations at each device in the SC can be determined.

If modification of the virtual switch (e.g., from OVS-DPDK 212A to VPP in virtual switch 214) results in a decreased latency between devices, it may be determined that changes to virtual switch 212A can improve traffic flow performance in production SC 201. Similarly, if configuration changes in HTTP Server 216 (e.g., to implement Deflate compression in server 216) result in latency reductions, it may be determined that modifications of the compression scheme implemented in HTTP Server 210A are likely to improve flow performance in production SC 201. In some implementations, mutated parameters that are determined to improve flow characteristics in a cloned SC can be used to provide automatic configuration updates to the production SC.

By way of further example, the virtual switch settings for first cloned SC 203, and HTTP Server compression settings for second cloned SC 205 can be saved and/or automatically pushed as network changes (e.g., by a network controller) to update production SC 201. In some approaches, production SC cloning and configuration mutation can be performed to automatically determine new configuration settings for the production SC. Depending on implementation, parameter tuning for a production SC can be performed periodically, or in response to one or more predetermined events, such as updates/changes made in the network environment.

Figure 2B:
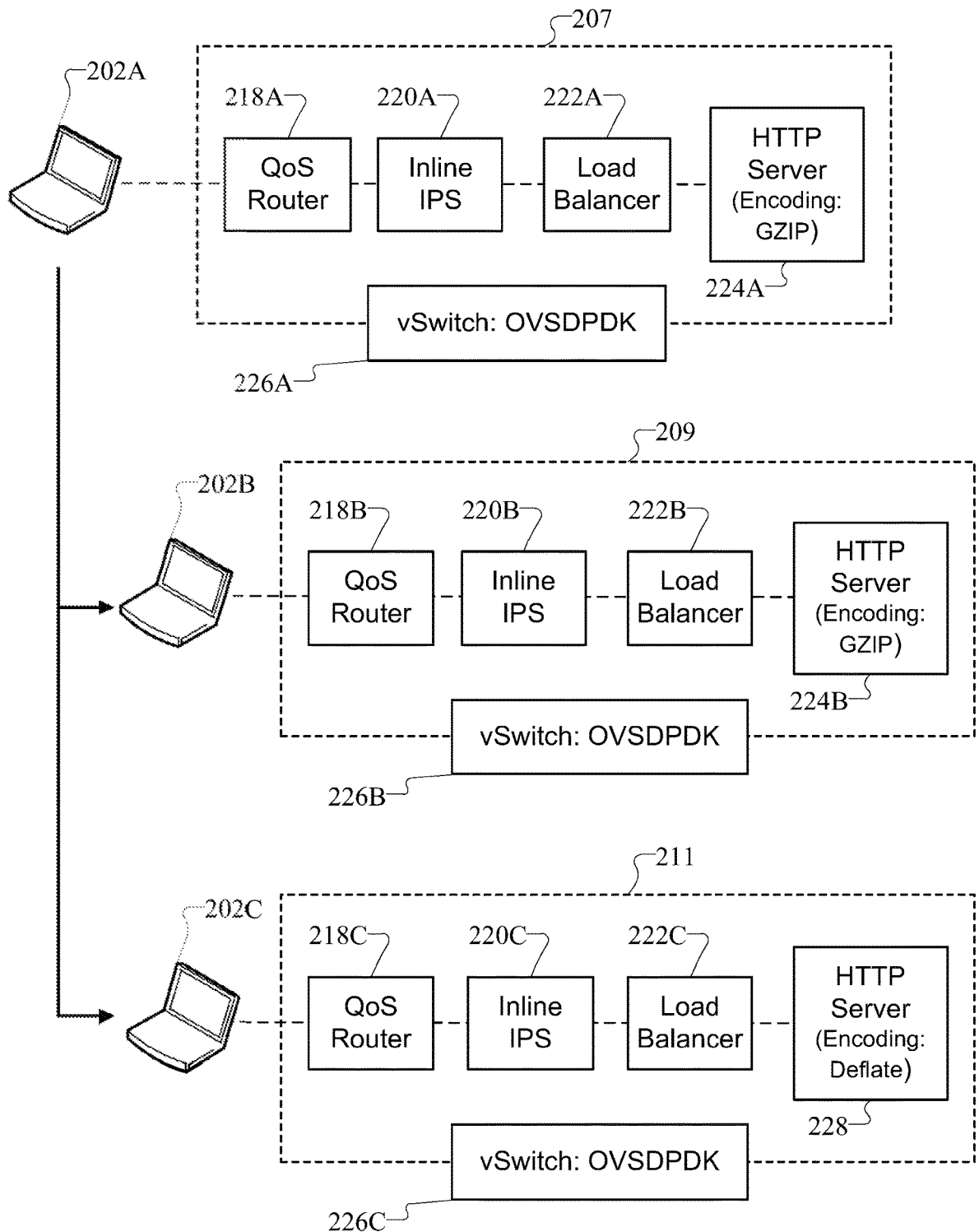

FIG. 2B conceptually illustrates another example of a production SC mutation that can be implemented using the disclosed technology. In the example of FIG. 2B, production SC 207 is identically duplicated (with no parameter changes) as cloned SC 209, and duplicated (with changes) as cloned SC 211. In such implementations, true A/B testing (i.e., "split-run testing") can be performed, for example, by observing how traffic flows behave in a cloned SC that is functionally identical to the selected production SC.

In practice, production SC 207 and cloned SC 209 contain substantially identical devices and configuration parameters (e.g., QoS Routers 218, Inline IPS 220, Load Balancer 222, and HTTP Server 224, connected by vSwitch 226). However, SC 211 contains HTTP server 228, which implements a compression scheme (Deflate) that is different from that of cloned SC 209 (GZIP). Using an identical copy of production SC 207 (i.e., cloned SC 209), and a modified version (i.e., cloned SC 211), A/B testing can be performed, for example, by determining how identical traffic flow performance may differ between clones 209, and 211.

Similar to the example of FIG. 2A, configuration changes that are determined to improve traffic flow performance on cloned SC 211 can be automatically pushed to production SC 207, for example, by a network controller for other configuration device. In some instances, new network settings may be first provided to a user (e.g., a system administrator) for approval, before being pushed out to the network. As understood by those of skill in the art, parameter changes to a production SC can be made on a device-by-device basis, for example, using an application programming interface (API) of the respective device.

Although the examples, illustrated in FIGS. 2A and 2B only depict two duplications of a production SC, it is understood that any number of clones can be made. Additionally, each cloned SC can include multiple configuration changes, without departing from the scope of the technology. Accordingly, through the systematic SC duplication and parameter mutation, optimal configuration settings can be determined for a selected production SC. As discussed in further detail below, optimal configuration parameters for a given service chain can be stored to a database, for example, and used to initialize (or inform) configuration changes for similarly implemented SCs in other networking contexts, and/or for similar traffic flows with similar profiles.

In some aspects, parameter tuning for a selected production SC can be automatically performed on an ongoing basis, such as at predetermined time intervals. In other aspects, production SC tuning may be performed in response to one or more network events, such as an update or configuration change made to one or more devices, the instantiation/removal of a device from the network fabric, and/or changes in traffic flow characteristics, e.g., changes in traffic destination, type, bandwidth usage, or quality-of-service requirements.

Figure 3:
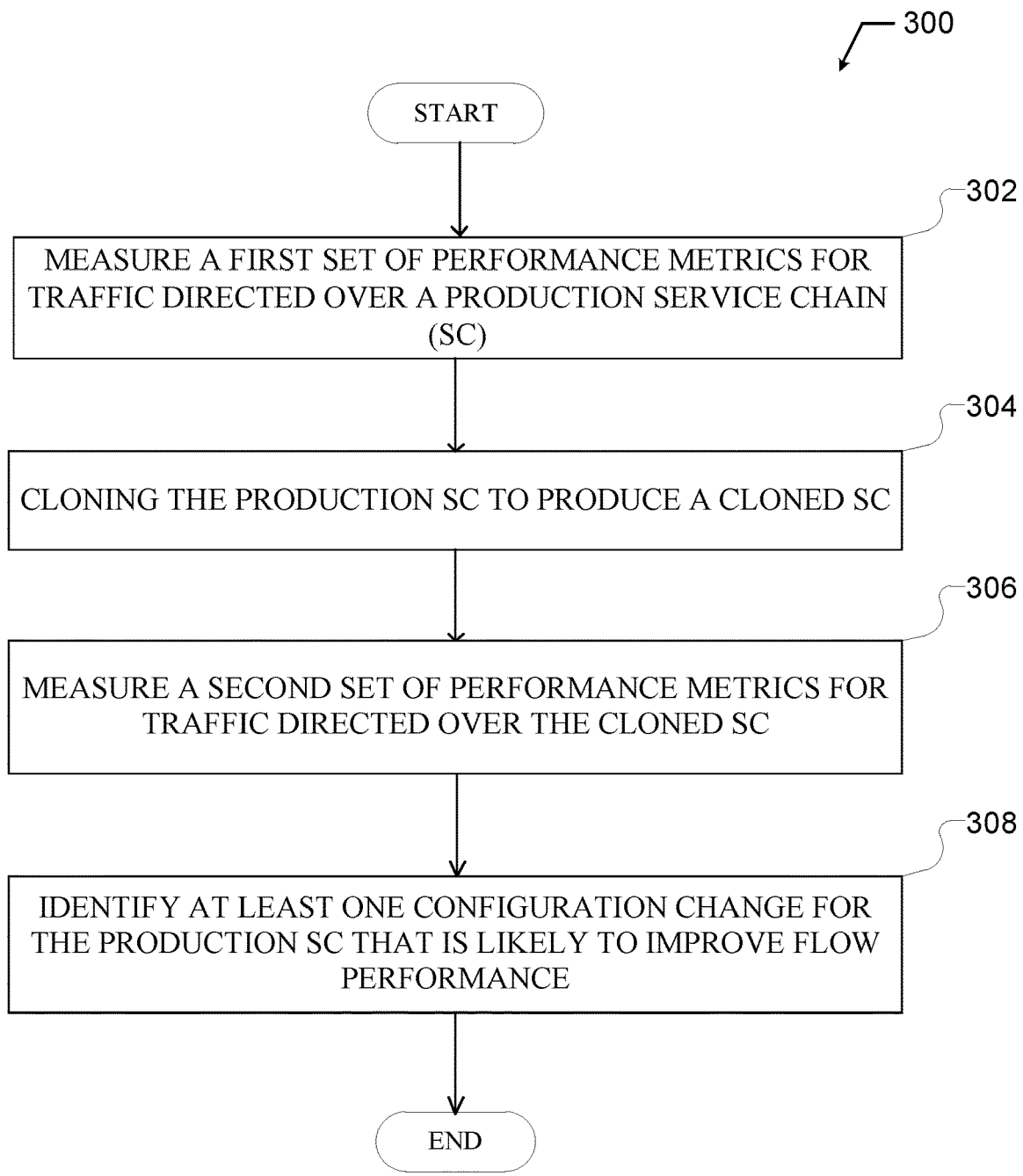
FIG. 3 illustrates steps of an example process for cloning and mutating various configurable parameters of a production service chain, according to some aspects of the technology.

FIG. 3 illustrates steps of an example process 300 for implementing an automatic production service chain parameter tuning solution. Process 300 begins with step 302, in which a first set of performance metrics are measured for traffic directed over a production service chain. As discussed above, the production service chain (SC) can contain essentially any type/arrangement of virtual network devices, for example, such as illustrated in FIGS. 2A and 2B, discussed above.

The type of performance metric/s measured for traffic flows over the production SC may vary with implementation. For example, end-to-end times for one or more packets traversing the SC can be measured. Additionally, processing times and/or throughput for one or more devices in the chain, and/or packet latency for transmissions between devices may also be measured.

It is understood that various speed and quality metrics for the production SC can be determined to assess performance. As discussed in greater detail below, these performance metrics can be used to determine if modified parameters for one or more cloned SC provide traffic flow performance enhancements.

In step 304, the production SC is cloned to produce a (first) cloned SC, for example, in which one or more parameters have been modified. A non-exhaustive summary of example parameters that can be modified is provided in further detail below; however, one of skill in the art will recognize that essentially any change in configuration or arrangement, to one or more of the devices in the cloned SC, can count as a parameter change or SC mutation.

In practice, traffic flows that traverse the production SC are duplicated, for example at a head-end node, and provided to the cloned SC. In this manner, the cloned SC is subject to the same traffic load as the production SC.

Subsequently, in step 306, a second set of performance metrics is measured for traffic directed over the cloned SC. Although the second set of performance metrics can include essentially any measurable quality of traffic throughput/transfer, in some aspect the second set of performance metrics includes essentially the same measurements as were determined in the first set (step 302), for comparison purposes.

The second set of performance metrics are compared to the first set of performance metrics to determine if parameter changes in the cloned SC resulted in an improvement for the processed traffic flow. In instances where the second set of performance metrics represent potential improvements over the first set of performance metrics (i.e., reduced end-to-end times, reduced processing time for one or more device in the cloned SC, and/or reduced packet transfer delays between devices), it may be inferred that similar changes would produce similar improvements in traffic flows over the production SC.

Configuration changes determined to likely improve flow performance can be saved, for example, to a database that correlates SC data-path settings with various network and traffic-flow characteristics. In some approaches, a database may be configured to correlate sets of traffic characteristics (e.g., a traffic profile) with service chain configuration characteristics (e.g., a service chain profile). Based on corresponding traffic profiles and service chain profiles, the database may be used to identify candidate parameter mutations to be tested in one or more subsequent cloned SC instantiations, for example, in the same (or a different) network environment.

In step 308, at least one configuration change that is determined to likely improve traffic flow performance for the production SC is identified. The identified configuration change/s can be automatically pushed, so that the configuration of the production SC is automatically tuned for optimal traffic flow performance. Alternatively, one or more configuration update recommendations may be provided to a user (e.g., a network administrator) to verify that the network changes should be implemented before the new configuration is pushed out to the network. As discussed above, process 300 can be performed for a selected production SC on a periodic basis, or in response to certain detected changes in the network fabric.

By way of non-limiting example, production SC tuning can be performed in response to network changes, such as when: a new service function or device is added to (or removed from) an existing chain, a service chain is newly added to (or removed from) a NFV platform, a service function chain is moved to a new data center or underlying platform, a significantly new traffic profile is added to the network, and/or an existing traffic profile changes significantly. Parameter tuning can also be performed in response to an exceeded resource threshold for one or more devices in the service chain. By way of example, SC tuning can be performed if CPU usage exceeds a predetermined amount (e.g., 75% of total CPU capacity), if memory utilization exceeds a predetermined threshold (e.g., 80% of total memory capacity), of if a monitored threshold is reached (e.g., more than three packets sitting in an ingress queue), etc. Additionally, SC tuning can be performed in response to determinations that various performance thresholds have been met, or exceeded. For example, tuning can be performed in response to a determination that an end-to-end transaction time has exceeded a predetermined threshold (e.g., 3 ms), or that processing time for a particular type of function in the chain has exceeded a predetermined duration (e.g., a DPI function that exceeds 6 ms), etc.

In some aspects, parameter tuning of cloned SCs can be performed using a machine-learning (ML) approach. For example, one or more ML algorithms can be used to monitor traffic flow performance over production and cloned SCs, and to update the configurable parameters of the cloned SCs to identify configuration combinations that result in improved performance. As understood by those of skill in the art, virtually any number of production/cloned SCs may be monitored using a ML approach, for example, such that hundreds or thousands of active cloned SCs are monitored at any time, each with different parameters set by the ML algorithm.

As understood by those of skill in the art, virtually any parameter relating to a device or entire service chain (e.g., data path) may be altered, for example, in one or more SC clones. For example, parameters relating to RAM, CPU, or storage allocations to VM endpoints can be altered between various production SCs and SC clones. In some instances, providing additional resources to VM endpoints can increase performance, but often leads to diminishing returns as the bottleneck moves farther down the list; additionally, due to the finite nature of compute resources, increasing VM allocations may cause contention with other instances on the host.

In some aspects, parameters relating to RAM, CPU, or storage allocations to NFV devices can be altered between various production SCs and SC clones. Such parameters can affect allocation of resources to one or more virtualized device, such as a virtual router. As with VM allocations, increased NFV resource allocations can provide diminishing returns, especially in cases where throughput for a device is restricted by software license.

In some aspects, parameters corresponding to configurations for multi-queue support for one or more virtual network interface cards (NICs) can be altered between various production SCs and SC clones. For instance, a VM's virtual NIC may only have a single receive buffer. Adding multi-queue support can increase receive capacity in cases where one or more vCPUs are idle enough to service additional receive queues.

In some aspects, parameters relating to test access point (TAP) interface transmit queue lengths can be altered between production SCs and SC clones. For example, in some kernel-based virtual machines (KVMs)/OpenStack implementations, the TAP interface provides a virtual link from the host's kernel to the VM's virtual NIC. The default queue length in some deployments is relatively low by modern network standards (e.g., 500 packets). Increasing the queue length can increase the processing capacity of the link. However, careful tuning can be required as a queue size that is too large may increase latency, which is a concern for sensitive applications such as voice and video.

In some aspects, parameter tuning can be used to implement either Linux vEth pairs or OVS patch ports. By default, many deployments using Open vSwitch (OVS) to provide link layer connectivity to VMs (particularly in OpenStack environments) utilize Linux vEth pairs to deliver packets between OVS bridges. However, such implementations can cause performance bottlenecks as it involves switching packets in and out of user-space. In some implementations, a more efficient solution can be to replace vEth pairs with OVS patch ports to keep all packets processed within the kernel. Without a clone of the in-service data path, all networking on the host must be brought down to test this change, thus impacting traffic.

In some aspects, parameter tuning can be used to alter resources available to host hardware. Increasing resources (e.g., CPU, RAM, etc.), either by quantity or speed/efficiency, on host hardware typically improves performance. Parameter tuning can involve hosting all (or portions of the service chain functions) on the same or different hardware.

In some aspects, parameter tuning can be used to affect upgrades/downgrades of a host kernel version. Upgrading or downgrading the kernel of the host can result in performance differences, for example, to various guests (virtual services) running on them, since the host's kernel is still responsible for delivering packets to/from the guests.

In some aspects, one or more parameters can be manipulated to affect physical link aggregation between various production SCs and SC clones. For example, changes to link aggregation algorithms, such as Link Aggregation Control Protocol (LACP), can affect performance, depending on how well traffic is load balanced across physical links. Optimal load balancing can be highly context specific and therefore the load balancing algorithm depends heavily on the type of traffic to be processed by the environment. For example, an environment that deals in many small Transmission Control Protocol (TCP) and/or User Datagram Protocol (UDP) connections between similar endpoints could most benefit from L4-based algorithms, e.g., since the source and destination Internet Protocol (IP) addresses will often be the same for every flow.

In some aspects, one or more parameters can be manipulated to affect buffer capacity and/or processing capability of one or more network interface cards (NICs). Depending on implementation, parameter tuning can be used to affect a size of one or more packet buffers (e.g., similar to TAP interface transmit queue length tuning), and/or to upgrade a driver for more efficient processing.

In some aspects, one or more parameters can be manipulated to affect a type of packet forwarding technology that is implemented. In cloud environments, there are many options for packet forwarding technologies and each have advantages and disadvantages. For example, some deployments may have guests using the host's kernel as an intermediary between the virtual NIC and a physical NIC of the host to give them access to the physical network. This can often be a performance bottleneck depending on the speed and available resources of the host. Newer technologies such as vector packet processing (VPP), which can also be built on top of Data Plane Development Kit (DPDK) to provide more direct access to hardware, can help alleviate these bottlenecks and allow for better performance for packets that didn't enter or leave a particular node.

It is understood that the foregoing examples of tunable device parameters are not exhaustive, and that other service chain qualities or configurations can be modified without departing from the scope of the technology.

Figure 4:
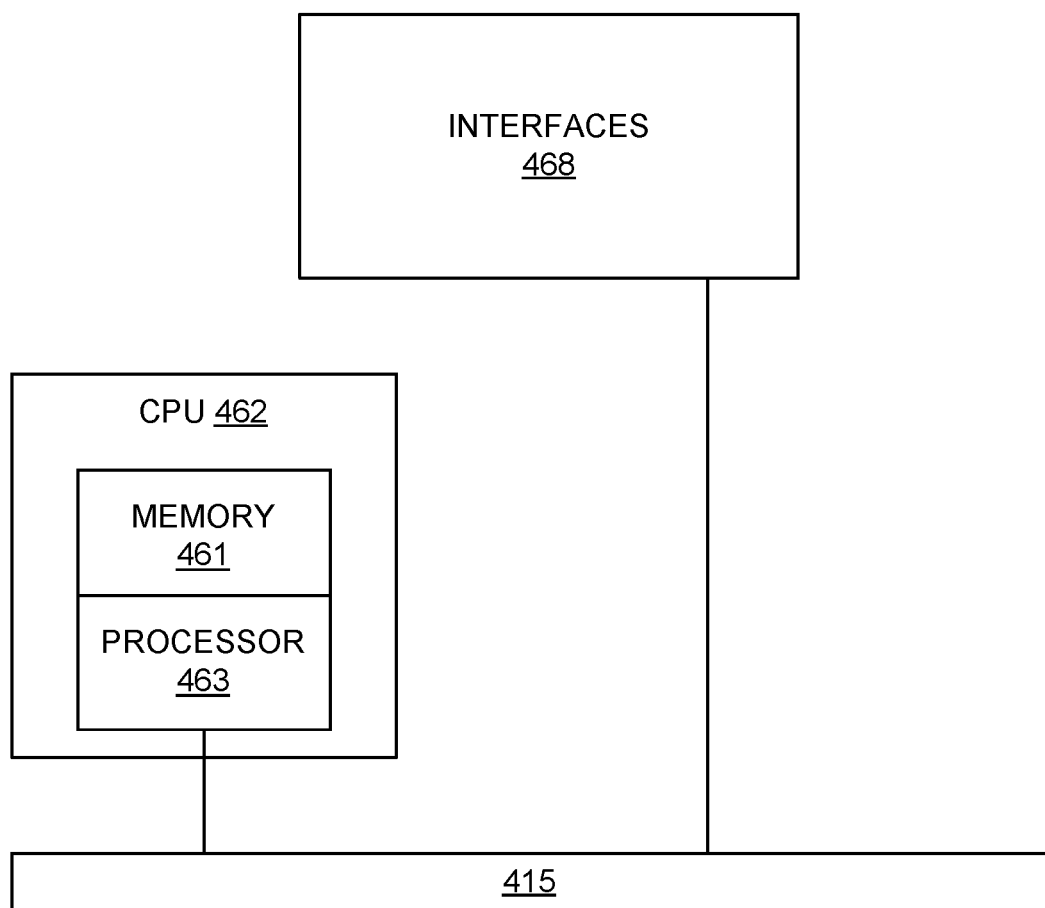
FIG. 4 illustrates an example network device on which some aspects of the technology can be implemented.

FIG. 4 illustrates an example network device 410 that can be used to implement one or more service chains (SCs), as discussed above. Network device 410 includes master central processing unit (CPU) 462, interfaces 468, and a bus 415 e.g., a Peripheral Computer Interconnect (PCI) bus. CPU 462 can be configured to perform monitoring for one or more virtual network functions under the control of software including an operating system and any appropriate applications software. CPU 462 can include one or more processors 463, such as processors from the Intel, ARM, and/or Motorola family of microprocessors or the MIPS family of microprocessors. In an alternative embodiment, processor 463 is specially designed hardware for controlling the operations of network device 410. In a specific embodiment, a memory 461 (such as non-volatile RAM and/or ROM) also forms part of CPU 462. However, there are many different ways in which memory could be coupled to the system.

Interfaces 468 can be provided as interface cards (sometimes referred to as "network interface cards" (NICs) or "line cards"). Generally, they control the sending and receiving of data packets over the network and sometimes support other peripherals used with device 410. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 461) configured to store program instructions for general-purpose network operations and mechanisms necessary to implement one or more steps of a service chain auto-tuning process of the subject technology.

For example, memory 461 can include a non-transitory computer-readable medium that includes instructions for causing CPU 462 to execute operations for measuring a first set of performance metrics for a first traffic flow directed over a production service chain (SC), wherein the production SC comprises one or more devices, and cloning the production SC to produce a first cloned SC, wherein the first cloned SC comprises at least one parameter or device that is different from the production SC. In some aspects, the operations can further include steps for measuring a second set of performance metrics for a second traffic flow directed over the cloned SC, and based on the first set of performance metrics and the second set of performance metrics, identifying at least one configuration change for the production SC that is likely to improve flow performance for the first traffic flow directed over the production SC.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The invention claimed is:

1. A computer-implemented method comprising:
   implementing a production service chain (SC) with a plurality of devices, the production service chain defining a sequence of functions to perform on traffic flow using the plurality of devices, the production SC having a first set of performance metrics for a first traffic flow directed over the production SC;
   cloning the production SC to produce a cloned SC, wherein the cloned SC comprises a cloned plurality of devices corresponding to the plurality of devices, the cloned SC having a second set of performance metrics for a second traffic flow directed over the cloned SC, wherein at least one of the devices of the cloned plurality of devices has at least one parameter that is different from the plurality of devices; and
   based on the first set of performance metrics and the second set of performance metrics and in response to a predetermined event, applying the at least one parameter that is different from the at least one of the devices of the cloned plurality of devices to a respective one of the plurality of devices.

2. The computer-implemented method of claim 1, wherein the predetermined event is a time interval.

3. The computer-implemented method of claim 1, wherein the predetermined event is one or more network events.

4. The computer-implemented method of claim 1, wherein the first set and second set of performances metrics measure, in the first and second traffic flows, a type.

5. The computer-implemented method of claim 1, wherein the first set and second set of performances metrics measure, in the first and second traffic flows, bandwidth usage.

6. The computer-implemented method of claim 1, wherein the first set and second set of performances metrics are measured over a time interval.

7. The computer-implemented method of claim 1, further comprising:
   based on the first set of performance metrics and the second set of performance metrics and in response to a second predetermined event, resetting the at least one parameter that is different from the at least one of the devices of the plurality of devices is the first cloned SC to a respective one of the plurality of devices of the production SC.

8. A system comprising:
   one or more processors; and
   a non-transitory computer-readable medium comprising instructions stored therein, which when executed by the one or more processors, cause the one or more processors to:
   implement a production service chain (SC) with a plurality of devices, the production service chain defining a sequence of functions to perform on traffic flow using the plurality of devices, the production SC having a first set of performance metrics for a first traffic flow directed over the production SC;
   clone the production SC to produce a cloned SC, wherein the cloned SC comprises a cloned plurality of devices corresponding to the plurality of devices, the cloned SC having a second set of performance metrics for a second traffic flow directed over the cloned SC, wherein at least one of the devices of the cloned plurality of devices has at least one parameter that is different from the plurality of devices; and
   based on the first set of performance metrics and the second set of performance metrics and in response to a predetermined event, apply the at least one parameter that is different from the at least one of the devices of the cloned plurality of devices to a respective one of the plurality of devices.

9. The system of claim 8, wherein the predetermined event is a time interval.

10. The system of claim 8, wherein the predetermined event is one or more network events.

11. The system of claim 8, wherein the first set and second set of performances metrics measure, in the first and second traffic flows, a type.

12. The system of claim 8, wherein the first set and second set of performances metrics measure, in the first and second traffic flows, bandwidth usage.

13. The system of claim 8, wherein the first set and second set of performances metrics are measured over a time interval.

14. The system of claim 8, further comprising instructions, which when executed by the one or more processors, causes the one or more processors to:
   based on the first set of performance metrics and the second set of performance metrics and in response to a second predetermined event, reset the at least one parameter that is different from the at least one of the devices of the plurality of devices is the first cloned SC to a respective one of the plurality of devices of the production SC.

15. A non-transitory computer-readable medium comprising instructions stored therein, which when executed by one or more processors, cause the one or more processors to:
    implement a production service chain (SC) with a plurality of devices, the production service chain defining a sequence of functions to perform on traffic flow using the plurality of devices, the production SC having a first set of performance metrics for a first traffic flow directed over the production SC;
    clone the production SC to produce a cloned SC, wherein the cloned SC comprises a cloned plurality of devices corresponding to the plurality of devices, the cloned SC having a second set of performance metrics for a second traffic flow directed over the cloned SC, wherein at least one of the devices of the cloned plurality of devices has at least one parameter that is different from the plurality of devices; and
    based on the first set of performance metrics and the second set of performance metrics and in response to a predetermined event, apply the at least one parameter that is different from the at least one of the devices of the cloned plurality of devices to a respective one of the plurality of devices.

16. The non-transitory computer-readable medium of claim 15, wherein the predetermined event is a time interval.

17. The non-transitory computer-readable medium of claim 15, wherein the predetermined event is one or more network events.

18. The non-transitory computer-readable medium of claim 15, wherein the first set and second set of performances metrics measure, in the first and second traffic flows, a type.

19. The non-transitory computer-readable medium of claim 15, wherein the first set and second set of performances metrics measure, in the first and second traffic flows, bandwidth usage.

20. The non-transitory computer-readable medium of claim 15, wherein the first set and second set of performances metrics are measured over a time interval.

\* \* \* \* \*